(No Model.) 2 Sheets—Sheet 1.

A. BOLZANI.
BRAKE FOR HOISTING OR LIFTING APPARATUS.

No. 525,528. Patented Sept. 4, 1894.

Witnesses:
Walter Allen
J. H. Wister

Inventor
Anton Bolzani
by Herbert W. T. Jenner
Attorney

THE NORRIS PETERS CO., PHOTO-LITHO., WASHINGTON, D. C.

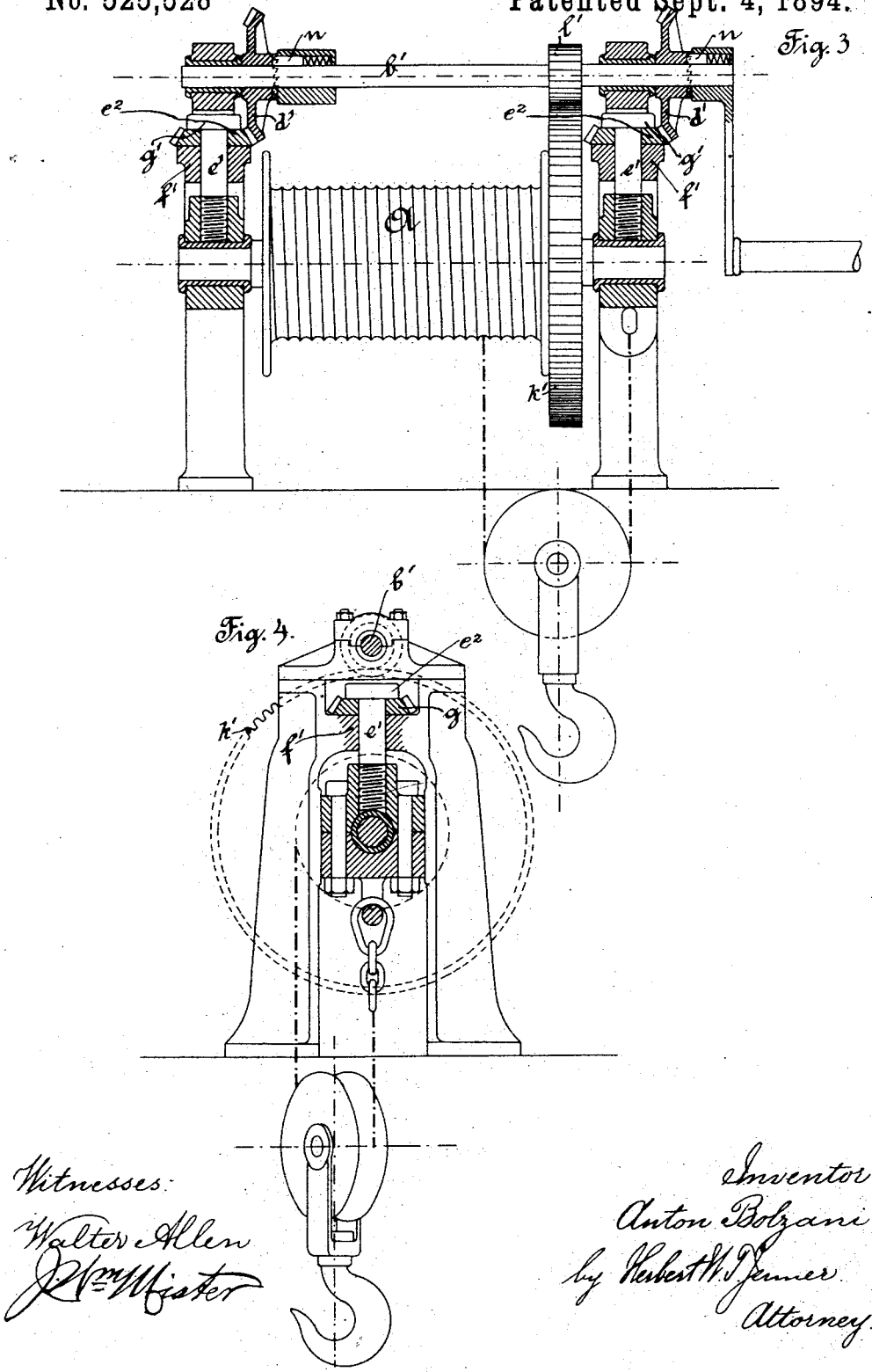

UNITED STATES PATENT OFFICE.

ANTON BOLZANI, OF BERLIN, GERMANY.

BRAKE FOR HOISTING OR LIFTING APPARATUS.

SPECIFICATION forming part of Letters Patent No. 525,528, dated September 4, 1894.

Application filed March 1, 1894. Serial No. 501,997. (No model.)

*To all whom it may concern:*

Be it known that I, ANTON BOLZANI, a subject of the King of Prussia and German Emperor, residing at Berlin, Prussia, Germany, have invented certain new and useful Improvements in Brakes for Hoisting or Lifting Apparatus; and I do hereby declare the following to be a full, clear, and exact description of the invention, such as will enable others skilled in the art to which it appertains to make and use the same.

This invention has for its object an arrangement for braking the descending load in hoisting or lifting apparatus, that is to say, for stopping the lift automatically at any point, which arrangement has the advantage over all others of being as simple as it is possible to conceive, and in consequence of this great simplicity it is impossible for the brake not to act.

Figure 1:
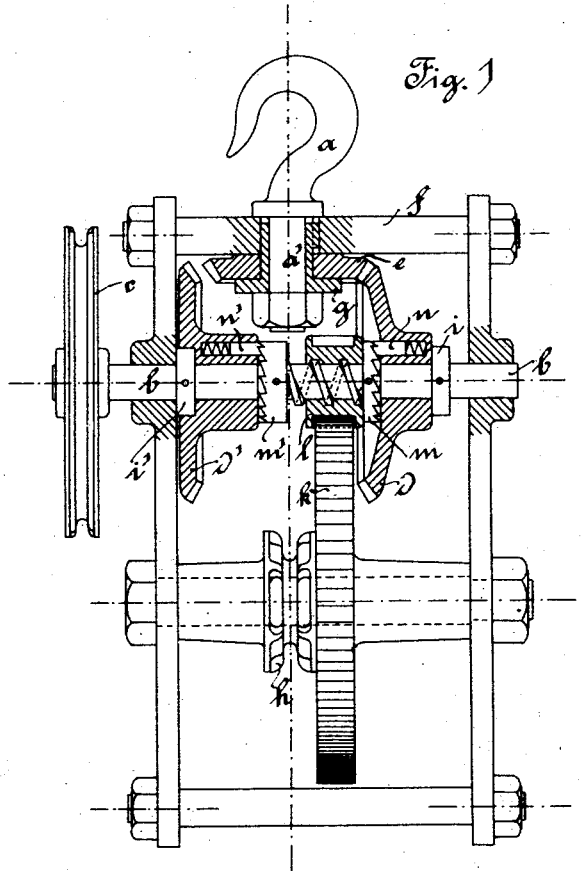
Figure 2:
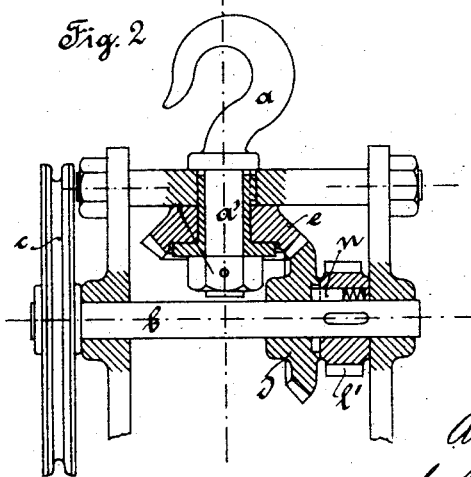

In the drawings: Figure 1 is a front view of a hoisting mechanism, partly in section, provided with a brake according to this invention. Fig. 2 is a similar view of the upper part of a hoisting mechanism provided with a simple form of brake. Fig. 3 is a front view, partly in section, of a winch constructed according to this invention. Fig. 4 is an end view of the winch, also partly in section.

The arrangement consists, as may be seen in Fig. 1 of the accompanying drawings, in prolonging the shank or downwardly directed cylindrical part $a'$ of the suspension hook $a$ of the block and pulley so far as to admit of the brake parts being placed directly thereon as on an axle. By this means, the pull on the hook produced by the load, that is to say, the full weight of the load, is utilized for the braking, the load acting with its full weight on the braking surfaces. In this case, for instance, the braking surfaces are supposed to be level ones, and the arrangement is made in such a way that two bevel wheels $d$ $d'$, seated on the horizontal axle $b$ of the hand chain wheel $c$ (which axle is also in gear with the pulley which carries the load chain or rope) engage with a third bevel wheel $e$ which moves between the cross-bar $f$ on the one hand and the disk $g$ on the other hand, the latter being connected with the frame of the block in such a way as not to be able to be revolved, but to be adjustable parallel to the axis of the hook, and thus, when this bevel wheel or brake wheel $e$ is rotated, if the pulley and block be loaded, frictional resistance is produced on the smooth sides of this wheel $e$. The two bevel wheels $d$ $d'$ must of course be so connected with their horizontal axle $b$, by means of ratchet devices, that, during the hoisting of the load, these wheels are not rotated, while, on the descent of the load, it is only possible for this axle to revolve by rotating these wheels with it, and thus act against the friction on the brake wheel $e$. If the load chain which passes over the pulley $h$ of the pulley block be provided at both ends with carrying hooks, the wheels $d$ $d'$ must be so connected with the gearing axle $b$ that one of them is always connected in such a way that, on the ascent of the load, no connection takes place between this wheel and the axle $b$, but, on the descent of the load, the wheel is rotated along with the gearing axle, and thus a braking takes place, while the second wheel, for instance $d'$, is disconnected during the ascent and descent of the load. This latter wheel must then come into action when a load is suspended to the other hook, while the former wheel ceases to operate.

In Fig. 1, the gearing axle $b$ is supported in such a way that it may be moved in the direction of its axis to right or left, to a certain extent which is indicated by set rings $i$ $i'$. The gearing wheel $k$ which is connected with the chain pulley $h$, engages with the pinion $l$ which is adjustable by means of a screw thread on the gearing axle, and this pinion $l$ is provided with side disks or flanges to insure its correct engagement, any axial adjustment being thus prevented. If the hand chain wheel $c$ be then revolved, the axle $b$ is screwed forward into the thread of the screw of the pinion $l$ which is prevented from rotating by the wheel $k$ and consequently by the load hanging on the pulley $h$, that is to say, the axle $b$ is moved according to its rotation to the right or left, until the pinion $l$ rests or bears against one or other of the rings or stops $m$ or $m'$ which are arranged on the axle. When this has taken place, if $b$ continues to rotate, $l$ will also be rotated and thus the load will be raised, this bearing of $l$ against $m$ is shown in the drawings. The wheels $d$ and $d'$ are axially retained between the stops $i$ and $m$ or $i'$ and $m'$ fixed on the axle $b$ in such a way that an engagement of only one of these wheels with the brake wheel $e$ takes place only in the end position of the axle $b$—while in the intermediate position neither of them engages with $e$; in the position shown only $d$ engages in the teeth of $e$, while $d'$ is disengaged. The wheels $d\,d'$ are also provided with spring socketed, pawl-like bolts $n\,n'$ which engage in ratchet teeth on the rings or stops $m$ or $m'$ so that the rotation of the wheels $d$ can only take place in one direction on the axle $b$. The pawl and ratchet teeth of $m$ are also so arranged that when the load being raised, no engaging of $m$ and $d$ takes place, but, on the contrary, when the load is descending, the wheel $d$ is carried round and consequently also the wheel $e$. The direction of the ratchet teeth on $m'$ is naturally reversed, as they are intended, to act when the direction of the power is reversed that is to say when the load is suspended to the other end of the chain. Thus according as the load is suspended on the one hook or the other of the chain, the wheel $d$ or the wheel $d'$ is engaged and consequently the raising of the load takes place without friction, but the lowering of the same only after overcoming the frictional resistance of the brake wheel $e$.

Fig. 2 shows a simple form of construction which is suitable for only one load hook. There is here only one wheel $d$ employed which may be connected with the driving pinion $l'$ in one direction of rotation, by means of a catch bolt or pawl $n$. This pinion $l'$ is in this case firmly connected with the axle $b$. When the load is rising, the ratchet teeth act in such a way that $d$ is not carried with the axle, while when the driving pinion $l'$ revolves in the opposite direction, $d$ is carried along with it and also $e$ and thus the braking takes place.

Figs. 3 and 4 show the invention applied to a winch. The winch barrel A has a toothed wheel $k'$ secured to it and driven by a toothed pinion $l'$ secured on the shaft $b'$, similar to the analogous parts shown in Fig. 1. The shaft $b'$ is revolved by an ordinary handle shown at the right hand in Fig. 3 and provided with a spring-actuated pawl $n$. The pawl $n$ engages with ratchet teeth on the hub of the beveled toothed wheel $d'$ which is loose on the shaft $b'$. The load and the hoisting barrel are suspended by the bar $e'$ provided with an end disk $g'$. The winch frame has a crossbar $f'$, and $g'$ is a toothed brake-wheel interposed between the disk $g'$ and the bar $f'$, and journaled on the bar $e'$. The above-described parts are preferably duplicated at the left hand of the winch as shown in Fig. 3.

The operation of the brake when applied to the winch is exactly the same as when applied to a block as hereinbefore described.

What I claim is—

1. In a hoisting mechanism, the combination, with a slidable bar suspending the said mechanism and its load and provided with a friction disk at its lower end, of a frame provided with a crossbar arranged above the said disk, a beveled-toothed brake-wheel interposed between the said disk and crossbar, a driving shaft journaled in the said frame, a toothed pinion operatively connected to the driving shaft and adapted to operate the hoisting devices, a beveled toothed wheel mounted on the said driving shaft and gearing into the beveled-toothed brake-wheel, and ratchet and pawl mechanism operatively connecting the said beveled toothed wheel and pinion, whereby the load is normally sustained by the said brake wheel, substantially as set forth.

2. In a hoisting mechanism, the combination, with a slidable bar suspending the said mechanism and its load and provided with a friction disk at its lower end, of a frame provided with a crossbar arranged above the said disk, a beveled-toothed brake-wheel interposed between the said disk and crossbar, a driving shaft journaled in the said frame, a toothed pinion operatively connected to the driving shaft and adapted to operate the hoisting devices, a ratchet wheel $m$ secured on the driving shaft, a beveled toothed wheel mounted on the said driving shaft and gearing into the beveled-toothed brake-wheel, and a spring-actuated pawl carried by the said beveled toothed wheel and engaging with the said ratchet wheel, substantially as set forth.

3. The combination, with a hoisting mechanism, of a slidable bar suspending it and its load, a brake-wheel loosely journaled on the said bar and normally held stationary between the lower end of the bar and the frame by the weight of the said hoisting mechanism and its load, and toothed driving wheels operatively connecting the said brake-wheel with the said driving mechanism, substantially as set forth.

4. In a hoisting mechanism, the combination, with the slidable suspension bar $a'$ provided with a disk $g$, of a frame provided with a crossbar, the beveled-toothed brake-wheel interposed between the said disk and crossbar, a slidable driving shaft journaled in the said frame and provided with a screwthreaded portion and the ratchet wheels $m\,m'$, the toothed pinion engaging with the said screwthreaded portion and adapted to operate the hoisting devices, the beveled toothed wheels $d\,d'$ adapted to be slid into gear with the said beveled-toothed brake-wheel, and the spring-actuated pawls carried by the wheels $d$ and $d'$ and engaging with the said ratchet wheels, substantially as set forth.

5. The combination, with a hoisting mechanism, of a slidable bar suspending it and its load, a frame provided with a crossbar, a toothed brake-wheel loosely journaled on the said bar between the end of the said bar and the crossbar and normally held stationary by the weight of the hoisting mechanism and its load, and driving devices operatively connecting the said brake wheel with the shaft by which the said hoisting mechanism is operated, substantially as set forth.

In testimony whereof I have affixed my signature in presence of two witnesses.

ANTON BOLZANI.

Witnesses:
 REINHARD WAGNITZ
 JEAN P. SCHMIDT.